(12) United States Patent
Kim

(10) Patent No.: US 7,010,040 B2
(45) Date of Patent: Mar. 7, 2006

(54) APPARATUS AND METHOD OF TRANSCODING IMAGE DATA IN DIGITAL TV

(75) Inventor: Eung Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 498 days.

(21) Appl. No.: 09/995,663

(22) Filed: Nov. 29, 2001

(65) Prior Publication Data
US 2002/0094030 A1  Jul. 18, 2002

(30) Foreign Application Priority Data
Nov. 30, 2000 (KR) ............... 2000-71951

(51) Int. Cl.
*H04N 7/12* (2006.01)
(52) U.S. Cl. ............... 375/240.16; 382/236; 348/416.1
(58) Field of Classification Search ........... 375/240.16, 375/240.01, 240.24, 240.02; 382/236, 238; 348/699, 416.1
See application file for complete search history.

(56) References Cited

U.S. PATENT DOCUMENTS

| 5,831,688 | A  | * | 11/1998 | Yamada et al. | ............. 348/699 |
| 6,178,202 | B1 | * | 1/2001  | Nakaya       | ................. 375/240.16 |
| 6,246,438 | B1 | * | 6/2001  | Nishikawa et al. | .... 375/240.01 |
| 6,687,302 | B1 | * | 2/2004  | Nakaya       | ................. 375/240.16 |
| 6,735,253 | B1 | * | 5/2004  | Chang et al. | .......... 375/240.16 |

* cited by examiner

*Primary Examiner*—Gims Philippe
(74) *Attorney, Agent, or Firm*—Fleshner & Kim, LLP

(57) ABSTRACT

A method and an apparatus of transcoding image data in a digital TV system are disclosed. The method and apparatus of the present invention performs global and local motion compensation processes while converting the particular data bit rate of input image data to a different data bit rate. As a result, the quality of the image can be greatly improved compared to other existing techniques. When there is no global motion detected in an image frame, the local motion compensation is performed based on new local motion vectors estimated or on the previous local motion information.

18 Claims, 4 Drawing Sheets

APPARATUS AND METHOD OF TRANSCODING IMAGE DATA IN DIGITAL TV

This application claims the benefit of the Korean Application No. P2000-71951 field on Nov. 30, 2000, which is hereby incorporated by reference.

BACKGROUND OF THE INVENTION

1. Field of the Invention

The present invention relates to a digital TV system, and more particularly, to an apparatus and a method of transcoding image data in a digital TV system. Although the present invention is suitable for a wide scope of applications, it is particularly suitable for converting a particular data bit rate of Moving Picture Experts Group (MPEG) data bit streams into a different data bit rate.

2. Discussion of the Related Art

Recently, encodements such as MPEG and many others are widely used in order to reduce the amount of digital video or audio data for storing and transmitting. Particularly, since various application processes such as data searching, Picture-In-Picture (PIP), data merging, data editing, and transmission rate conversion are necessary, an image data transcoding device and/or method for converting a particular data bit rate of an MPEG bit stream to a different data bit rate is required. Some of the cases where such transcoding device or method is necessary are conversion from an MPEG bit stream into a JPEG bit stream, conversion from Digital Video (DV) data of a digital camcoder into MPEG bit streams, or conversion from a High Definition (HD) MPEG bit stream into a Standard Definition (SD) MPEG bit stream.

In general, a typical image transcoding device includes a encoding part and a decoding part. When a set of image data having a particular data bit rate is converted to a set of data having a lower data bit rate in the image transcoding device, the image quality of the data is generally degraded. For this reason, a method of eliminating the high frequency AC coefficient in the MPEG decoder, a method of converting the data bit rate by re-quantization in the MPEG decoder, or a method of using a cascaded transcoder connecting the MPEG encoder and decoder is often used to maintain the image quality when converting the data bit rate of a set of image data.

First, the method of reducing the bit rate by eliminating the high frequency AC coefficient eliminates the DCT coefficient of each region having a data bit rate higher than the target bit rate, requiring a very simple hardware to achieve the objective. However, the image quality is still not good enough because an accumulative error occurs when eliminating each DCT coefficient.

Next, the method of the re-quantizing results a reasonably good image quality, but it requires a very complicated hardware. In addition, the third method requires a very complicated hardware since the cascaded transcoder includes an MPEG-2 encoder. However, this method achieves the best image quality among the mentioned methods.

Since the data storage capacities of many digital image related systems such as a digital VCR system are often limited, they do not store all of the MPEG bit streams received. For example, the data bit rate of the data streams must be reduced by half in order to increase the data storing speed two times. For the personal digital system, a method of reducing the data bit rate of a set of image data using a simple hardware is preferred due to its low cost. Therefore, the method of eliminating the high frequency AC coefficient or re-quantizing is more frequently used. The method of using the cascaded transcoder results a good image quality and can be used for a Video On Demand (VOD) server or a broadcasting station, but it further includes complicated processes including determining a new macro block mode or motion compensation mode.

SUMMARY OF THE INVENTION

Accordingly, the present invention is directed to a an apparatus and a method of transcoding image data in a digital TV set that substantially obviates one or more problems due to limitations and disadvantages of the related art.

An object of the present invention is to provide an apparatus and a method of transcoding image data in a digital TV system that is able to reduce the data bit rate of a set of image data while minimizing the damages on the image quality.

Another object of the present invention is to provide an apparatus and a method of transcoding image data in a digital TV system that is able to reduce the data bit rate of a set of image data while maintaining the image quality by using a global motion estimating technique.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus of transcoding image data in an image display system includes: a decoding part decoding an input video data stream in order to restore pixel values of the input data stream; an encoding part encoding the decoded input video data stream to generate a output video data stream having a different data bit rate; and an adaptive motion-compensator performing an active global motion compensation on the output video data stream using global motion parameters estimated based on motion and macro-block information of the input video data stream and further performing an active local motion compensation on the output video data stream using the motion information.

The adaptive motion-compensator of the apparatus described above includes: an adaptive motion-controller estimating the global motion parameters if the motion-controller determines that a global motion exists in the motion and macro-block information, the motion parameters representing a camera zoom level and a horizontal camera rotation level; a global motion-compensator performing the active global motion compensation on the output video data stream by calculating each pixel value of a current frame corresponding to the input video data stream using pixel values of a previous image frame, the previous image frame being determined by using the global motion parameters; and a local motion-compensator performing the active local motion compensation on the output video data stream.

In another aspect of the present invention, a method of transcoding image data in a digital TV system includes: (a) determining whether a global motion exists in a current image frame received using motion and macro-block information of the current image frame; (b) estimating global motion parameters if the global motion exists in the current image frame, the global motion parameters representing a camera zoom level and a horizontal camera rotation level.

The method further includes (c) performing a global motion compensation on the current image frame if the global motion exists in the current image frame by calculating each pixel value of the current image frame using its corresponding pixel values of a previous image frame, the previous image frame being determined by using the global motion parameters; and (d) further performing a local motion compensation on the current image frame.

The step (b) of the method described above includes: (b1) determining an error value of the current image frame by using the following equation if the global motion exists in the current image frame $$E(a, \vec{b}) = \sum_t |\hat{U}_2 - U_2|^2,$$

where $\alpha$ and $\vec{b}$ represent the global motion parameters, and $\hat{U}_2$ and $U_2$ represent image coordinates of the current image frame before and after a camera motion, respectively; (b2) setting previous global motion parameter values as the first and second global motion parameters if the error value is less than a limiting value, the previous first and second parameter values being estimated earlier for compensating the previous image frame; and (b3) newly estimating the global motion parameters if the error value is greater than or equal to the limiting value.

In addition, the step (c) of the method includes: (c1) determining a frame location of the previous image frame for compensating the current image frame by using $$I_t(U_2) = I_{t-1}(U_1) = I_{t-1}\left(\frac{1}{a}[U_2 - \vec{b}]\right);$$

and (c2) determining each pixel value of the current image frame by $$I_t(x_2, y_2) = I_{t-1}(x_1, y_1) +$$
$$\alpha[I_{t-1}(x_1 + 1, y_1) - I_{t-1}(x_1, y_1)] +$$
$$\beta[I_{t-1}(x_1, y_1 + 1) - I_{t-1}(x_1, y_1)] +$$
$$\alpha\beta[I_{t-1}(x_1, y_1) - I_{t-1}(x_1, y_1 + 1) +$$
$$I_{t-1}(x_1 + 1, y_1 + 1) - I_{t-1}(x_1 + 1, y_1)],$$

where $\alpha$ and $\beta$ are fractional numbers of each pixel location $(x_2, y_2)$ of the current frame in the previous frame.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
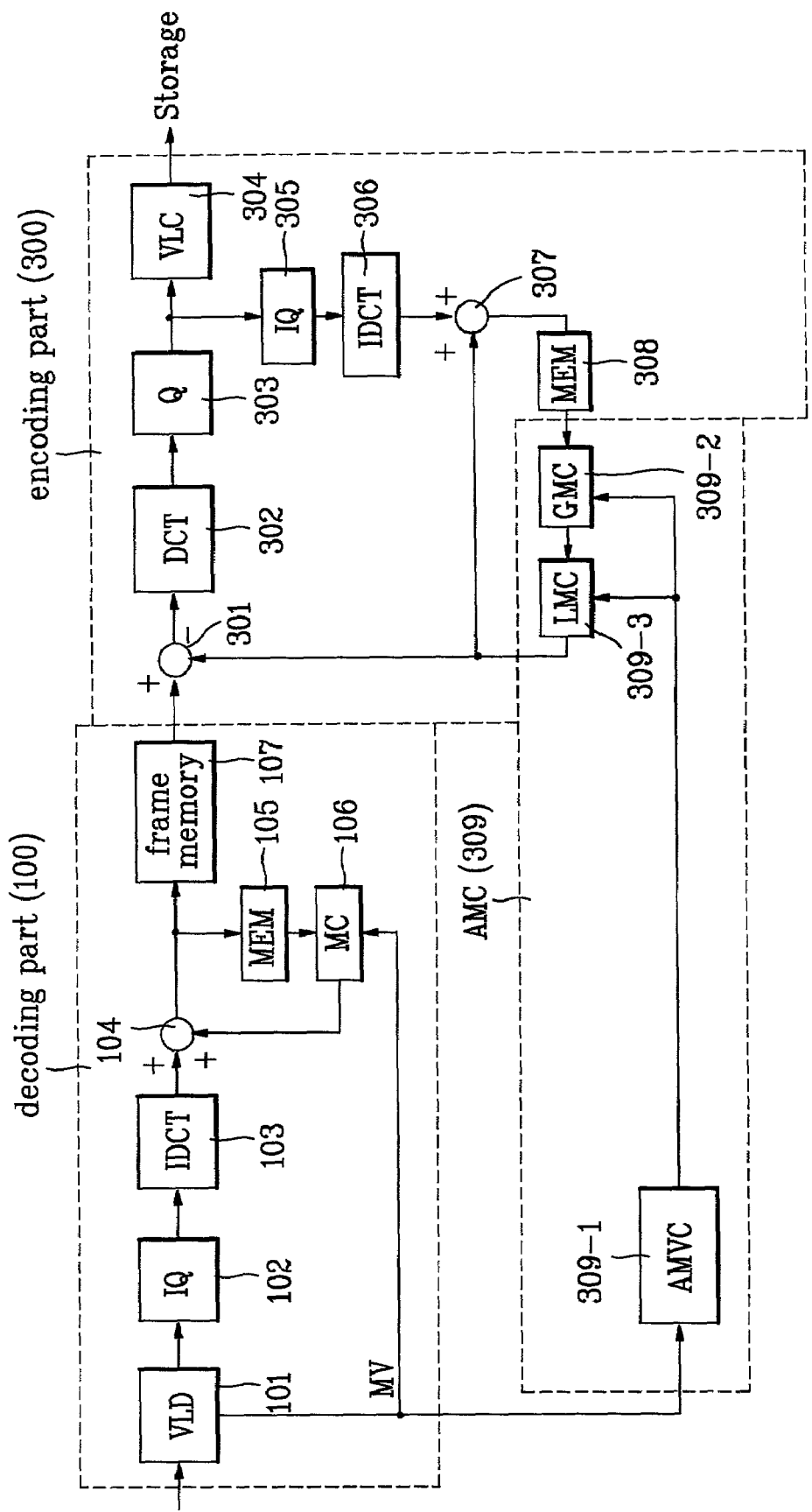
FIG. 1 illustrates an apparatus of transcoding image data in a digital TV system according to the present invention.

FIG. 1 illustrates an apparatus of transcoding image data in a digital TV set according to the present invention. The apparatus shown in FIG. 1 includes a decoding part 100, a encoding part 300, and an adaptive motion compensator 309. The decoding part 100 includes a variable length decoding (VLD) element 101 receiving an input video data stream and performing a variable length decoding process on the data stream received, an inverse quantizing (IQ) element 102 performing an inverse quantizing process on the encoded discrete cosine transformation (DCT) coefficient, an inverse discrete cosine transformation (IDCT) element 103 performing an IDCT process on the inverse-quantized DCT coefficient, an adder 104 adding the IDCT processed data with motion-compensated data, a memory 105 storing the data added in the adder 104, a motion compensator 106 performing a motion compensation process on the data stored in the memory 105 using a motion vector received from the VLD element 101, and a frame memory 107 storing the data added by the adder 104.

The encoding part 300 shown in FIG. 1 basically reduces the data bit rate of the decoded data received from the decoding part 100. It includes a subtracter 301 subtracting the motion-compensated data from the data outputted from the frame memory 107, a DCT element 302 performing a DCT process on the data outputted from the subtracter 301, a quantizing element 303 quantizing the coefficient processed in the DCT element 302, a variable length coding (VLC) element performing a VLC process on the quantized DCT coefficient, an inverse-quantizing (IQ) element 305 performing an inverse-quantizing process on the quantized DCT coefficient, an IDCT element 306 performing an IDCT process on the inverse-quantized coefficient from the IQ element 305, an adder 307 adding the data received from the IDCT element and the motion-compensated data, a memory 308 storing the data added in the adder 307.

The adaptive motion compensator performs an adaptive motion-compensation process on the data stored in the memory 308 and outputting the motion-compensated data to the subtracter 301 and the adder 307.

Figure 2:
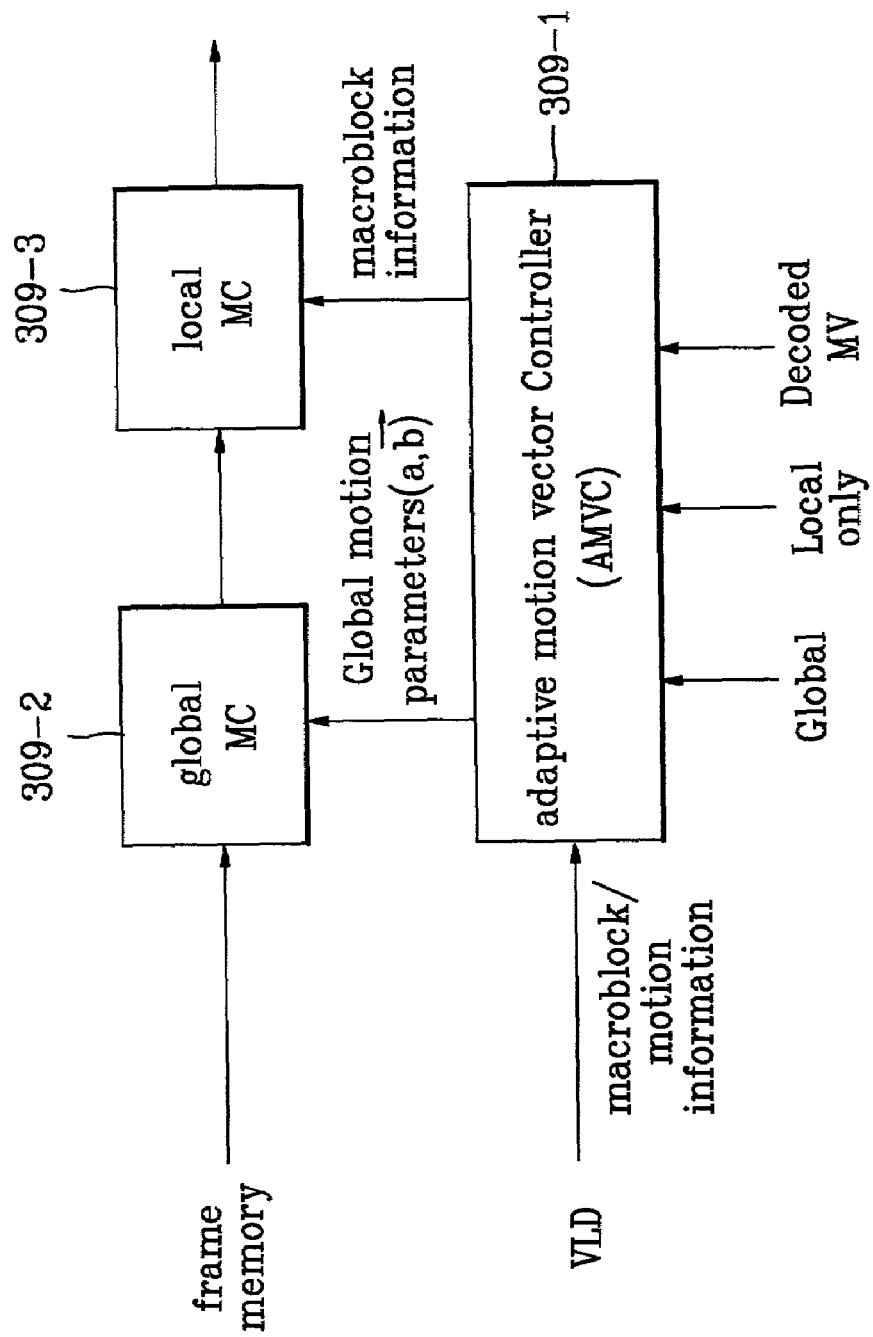
FIG. 2 illustrates an adaptive motion compensator of the transcoding apparatus shown in FIG. 1.

The FIG. 2 illustrates the adaptive motion-compensator 309 shown in FIG. 1 in detail. It includes an adaptive motion vector controller (AMVC) 309-1, a global motion compensator (global MC) 309-2, and a local motion compensator (local MC) 309-3. The AMVC 309-1 receives the motion and macro block information of the input data stream from the decoding part 100 and decides whether to perform global motion compensation. Thereafter, it controls the determined motion compensation process. The global MC 309-2 and local MC 309-3 perform the global or local motion compensation based on the result determined in the AMVC 309-1.

Figure 3:
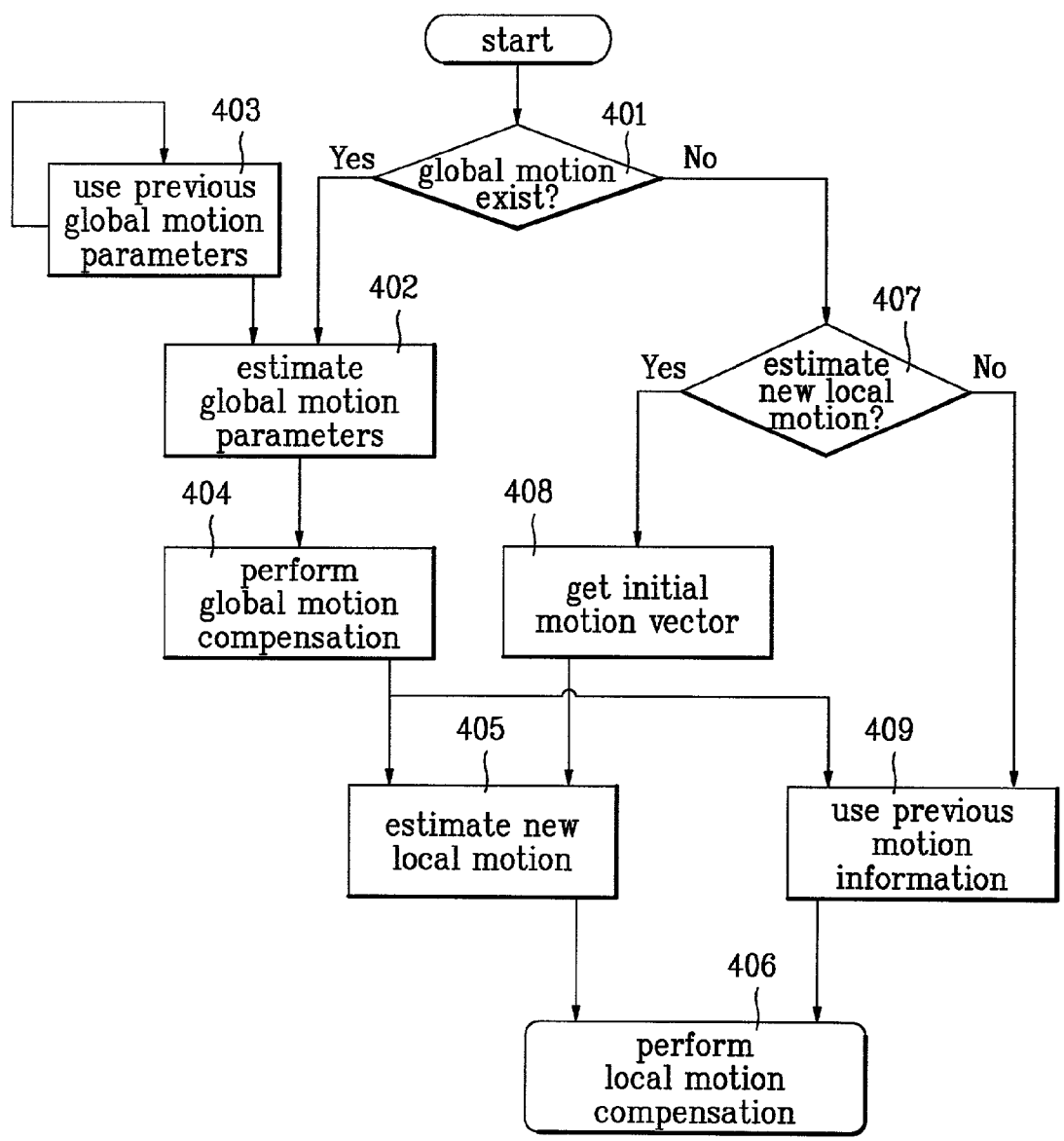
FIG. 3 illustrates a method of transcoding image data in a digital TV system according to the present invention.

The FIG. 3 is a flow chart illustrating a process of performing the motion-compensation by the AMC 309 after determining whether a global motion vector exists. Initially, the VLD element 101 of the decoding part 100 obtains motion information including motion vectors, a motion type and a motion field selecting signal, a quantization value, and a discrete cosine transformation (DCT) coefficient by performing a VLD process on an input video bit stream. Then it outputs the motion information to the motion compensator 106 and the adaptive motion vector controller (AMVC) 309-1 of the AMC 309 and outputs the quantization value and the DCT coefficient to the IQ element 102.

Next, the AMVC 309-1 determines whether any global motion exists in a current frame based on its macro block information and the motion information including motion vectors (S401). The determination of the AMVC 309-1 is done by comparing the numbers of the intra macro blocks and the non-intra macro blocks of the macro block and motion information decoded in the VLD element 101. Generally, the motion of the whole frame is consistent and the frame includes the non-intra macro blocks if a global motion exists. Therefore, if the number of the non-intra macro blocks is high, the possibility of the global motion existence is also high.

If it is determined that the global motion exists in the step 401, the AMVC 309-1 obtains global motion parameters (S402) by using $$\hat{U}_2 = a \cdot U_1 + \vec{b} \quad \text{[Equation 1]}$$

where $U_1$ and $\hat{U}_2$ represent image coordinates of the current frame before and after the camera motion, $a$ represents a first global motion parameter for camera zooming, and $\vec{b}$ represents a second global motion parameter for camera rotation (horizontal).

The relationship of the motion vector $d_1$ obtained from the actual video encoder with image coordinates are given by $$d_1 = U_1 - U_2 \quad \text{[Equation 2]}$$

where $U_1$ represents image coordinates of a previous frame, and $U_2$ represents image coordinates of a current frame. And, an error can be obtained by $$E(a, \vec{b}) = \sum_t |\hat{U}_2 - U_2|^2 \quad \text{[Equation 3]}$$

Then, the global parameters minimizing the error function are given by $$a = \frac{\sum \langle U_2, U_1 \rangle - \frac{1}{N} \langle \sum U_2, \sum U_1 \rangle}{\sum \langle U_1, U_1 \rangle - \frac{1}{N} \langle \sum U_1, \sum U_1 \rangle} \quad \text{[Equation 4]}$$

-continued $$\vec{b} = \frac{1}{N} \left( \sum U_2 - a \cdot \sum U_1 \right) \quad \text{[Equation 5]}$$

where $\langle , \rangle$ represents an inner product operation. Since the motion vector and the image coordinates of the previous frame are known, $U_2$ can be easily obtained.

Each of the global motion parameters of the camera changes in a rate similar to other parameters because the camera usually moves slowly. This means that the global motion parameter estimated previously can be used again. Therefore, if the error value obtained from Equation 3 is less than a predetermined limiting value, the prior global motion parameters previously used can be used again for compensating the current frame (S403).

When the global motion parameters $(a, \vec{b})$ are estimated using the steps S402 and S403, the global MC 309-2 performs the global motion compensation operation on the data stored in the memory 308 (S404). A bi-linear interpolation method can be used for the global motion compensation.

Figure 4:
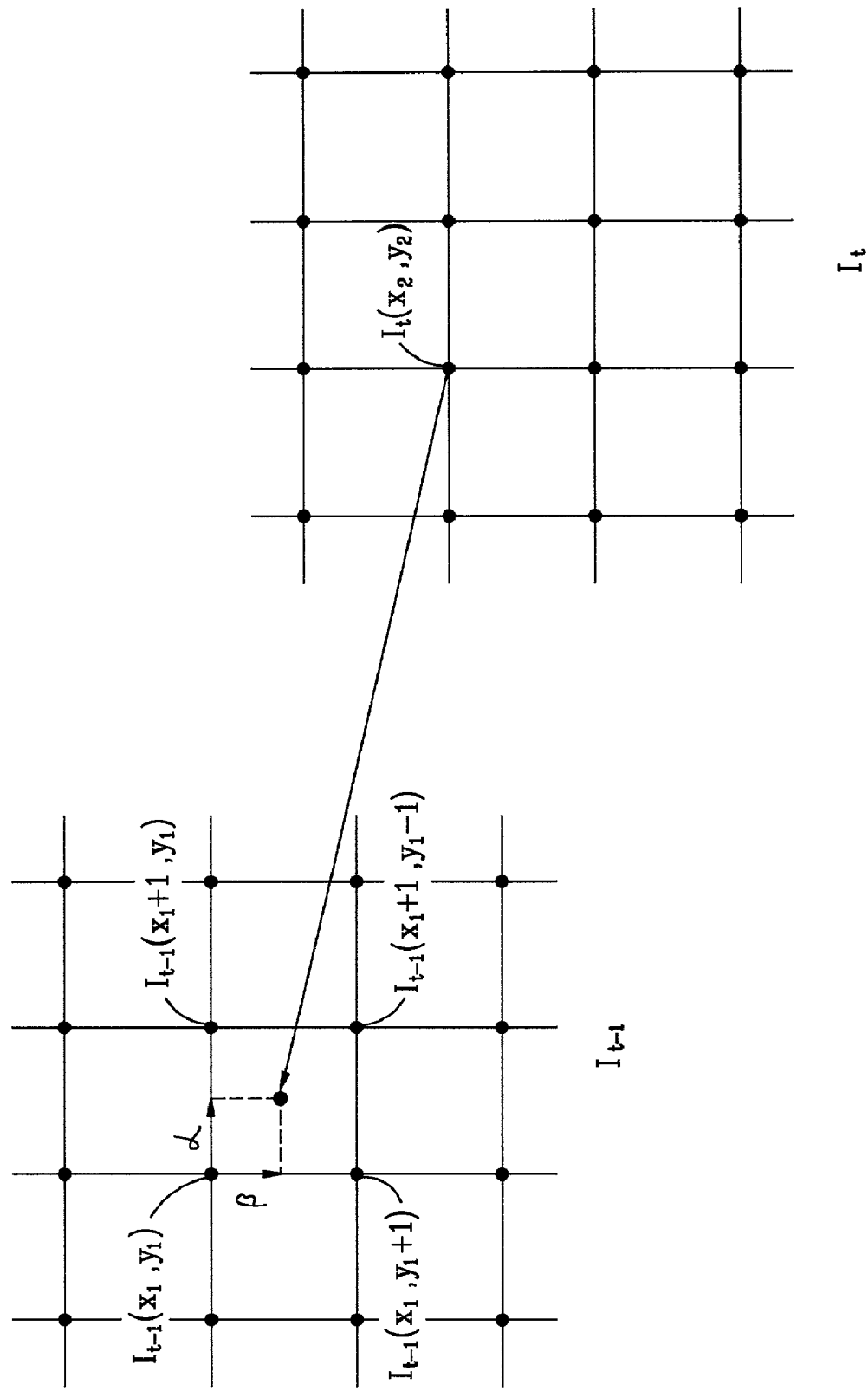
FIG. 4 illustrates an active global motion compensation process using a bi-linear interpolation method in accordance with the present invention.

FIG. 4 illustrates a motion compensation process using a bi-linear interpolation method in accordance with the present invention. As it can be shown from the figure, the pixels of a current frame are replaced with its corresponding pixels of a previous frame. Since the frame location obtained from Equation 1 is a real number, its corresponding pixel value is obtained by interpolating the values of the pixels whose locations are integers. These are given by $$I_t(U_2) = I_{t-1}(U_1) = I_{t-1}\left(\frac{1}{a}[U_2 - \vec{b}]\right) \quad \text{[Equation 6]}$$

$$\begin{aligned} I_t(x_2, y_2) = &\, I_{t-1}(x_1, y_1) + \\ &\, \alpha[I_{t-1}(x_1 + 1, y_1) - I_{t-1}(x_1, y_1)] + \\ &\, \beta[I_{t-1}(x_1, y_1 + 1) - I_{t-1}(x_1, y_1)] + \\ &\, \alpha\beta[I_{t-1}(x_1, y_1) - I_{t-1}(x_1, y_1 + 1) + \\ &\, I_{t-1}(x_1 + 1, y_1 + 1) - I_{t-1}(x_1 + 1, y_1)] \end{aligned} \quad \text{[Equation 7]}$$

where $\alpha$ and $\beta$ are fractional numbers of the location of each pixel of the current frame in the previous frame.

Using Equations 6 and 7, the location of a previous frame necessary for compensating a current frame is initially found, and each pixel of the current frame is replaced with predetermined pixels of the previous frame found in Equation 6. Thereafter, the AMVC 309-1 estimates a local motion (S405), and the local MC 309-3 performs the local motion compensation operation based on the estimated local motion (S406).

As it can be shown in FIG. 3, the local motion compensation is performed after the global motion compensation of the whole image is performed. Therefore, each motion can be estimated much more precisely, knowing that each local motion can be independent from the global motion.

For estimating the local motion, a block matching technique can be used. When using such technique, the search region of the motion vector can be set to a smaller area than the search region of the decoded motion. Therefore, the data processing rate can be improved.

When the AMVC 309-1 determines that there is no global motion, or the global motion compensation operation is completed, a user can select to newly estimate the local motion vector or to use the previously encoded motion information (S407). If the user desires to newly estimate the local motion vector, the AMVC 309-1 obtains the initial motion vector based on the decoded motion information and estimates a new motion vector using the initial motion vector (S408). Thereafter, the local MC 309-3 performs the local motion compensation operation using the new motion vector. By newly estimating the local motion vector, a higher video data encoding rate can be achieved.

Namely, in the steps of S408, S405, and S406, the local motion vector and the motion mode for each macro block are set using the frame compensated by using the global motion vector. In addition, since the macro block information is used again, the step of determining a new macro block pattern is skipped. Even if the search range is limited to −5 to 5, the image quality still better than the method of using the previous decoded motion information. This is because the quantization interval used in the video transcoder is larger than that of the decoded data.

On the other hand, if the user decides to use the previous motion information in the step S407, then the local MC 309-3 performs the local motion compensation operation (S406) using the previous motion information (S409).

The frame estimated in the adaptive motion compensator 309 is outputted to the subtracter 301 and the adder 307. The subtracter 301 then outputs the difference between the estimated frame and the frame stored in the frame memory 107 to the DCT element 302. Thereafter, the DCT element 302 performs the discrete cosine transformation operation on the difference received from the subtracter 301.

The quantizing element 303 performs a quantization operation on the DCT coefficient received from the DCT element 302 in macro block units, and it outputs the quantized data to the VLC element 304. The quantizing element 303 and the VLC element 304 of the encoding part 300 can be replaced with an existing MPEG video encoder. But it is possible not to change the syntax of the MPEG bit stream by adding the global motion parameters to the user data region when storing the bit stream. However, there is no need to match with the MPEG syntax for storing the video data in a personal video data storing device or any other hard disc. The point is to achieve a higher image quality and more efficient reduction rate.

Therefore, the apparatus of transcoding image data enables the system to store a large number of MPEG-2 bit streams transmitted to a digital VCR or a digital TV setup box. In addition, the present invention is able to convert the HD or SD level video signal having a high bit rate into the bit streams having a lower data bit rate. Furthermore, the transcoding apparatus of the present invention can be implemented inside of the TV set or in a sep-up box type device. Particularly, the present invention is crucially essential when used in a digital TV set or digital VCR having a build-in storage device. It also can be used for various video data servers or personal video recorders.

In conclusion, the present invention converts the high transmission bit rate of a MPEG video sequence into a lower bit rate by using the global motion compensation. Therefore, the image quality can be maintained, while the receiver efficiently stores the received data. In addition, the data processing rate can be greatly improved, and the drift error of the existing video transcoding device can be reduced by using the previously decoded motion vectors. The local motion compensation is performed by estimating a new local motion vector or by using the previous motion information. First method increases the video encoding rate and the data processing efficiency by performing the compensation after estimating the initial motion vector. On the other hand, the other method is able to perform a fast data transcoding process because it does not require any new motion estimation.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. An apparatus of transcoding image data in an image display system, the apparatus comprising:
   a decoding part decoding an input video data stream in order to restore pixel values of said input data stream;
   an encoding part encoding said decoded input video data stream to generate a output video data stream having a different data bit rate; and
   an adaptive motion-compensator performing an active global motion compensation on said output video data stream using global motion parameters estimated based on motion and macro-block information of said input video data stream and further performing an active local motion compensation on said output video data stream using said motion information, wherein said adaptive motion-controller estimates said global motion parameters by initially determining an error value of said current image frame by setting previous global motion parameter values as said global motion parameters if said error value is less than a limiting value, and newly estimating said global motion parameters if said error value is greater than or equal to said limiting value.

2. The apparatus of claim 1, wherein said adaptive motion-compensator includes:
   an adaptive motion-controller estimating said global motion parameters if said motion-controller determines that a global motion exists in said motion and macro-block information, said motion parameters representing a camera zoom level and a horizontal camera rotation level;
   a global motion-compensator performing said active global motion compensation on said output video data stream by calculating each pixel value of a current frame corresponding to said input video data stream using pixel values of a previous image frame, said previous image frame being determined by using said global motion parameters; and
   a local motion-compensator performing said active local motion compensation on said output video data stream.

3. The apparatus of claim 2, wherein said adaptive motion-controller determines whether said global motion exists in said motion information by comparing a first number of intra macro blocks and a second number of non-intra macro blocks of said motion and macro-block information.

4. The apparatus of claim 2, wherein said adaptive motion-controller estimates said global motion parameters by initially determining said error value of said current image frame by $$E(\vec{a},\vec{b}) = \sum_{t} |\hat{U}_2 - U_2|^2,$$

setting said previous global motion parameter values as said global motion parameters if said error value is less than said limiting value, and newly estimating said global motion parameters if said error value is greater than or equal to said limiting value, where $\alpha$ and $\vec{b}$ represent said global motion parameters, and $\hat{U}_2$ and $U_2$ represent image coordinates of said current image frame before and after a camera motion, respectively.

5. The apparatus of claim 4, wherein said global motion parameters are newly estimated by $$a = \frac{\sum \langle U_2, U_1 \rangle - \frac{1}{N} \langle \sum U_2, \sum U_1 \rangle}{\sum \langle U_1, U_1 \rangle - \frac{1}{N} \langle \sum U_1, \sum U_1 \rangle} \text{ and}$$

$$\vec{b} = \frac{1}{N}\left(\sum U_2 - a \cdot \sum U_1\right),$$

where
(,) represents an inner product operation,
$U_1$ represents image coordinates of said previous image frame, and
$U_2$ represents image coordinates of said current image frame.

6. The apparatus of claim 1, wherein said global motion compensation is performed by using a bi-linear interpolation method.

7. The apparatus of claim 2, wherein said global motion-compensator performs said active global motion compensation by initially determining a frame location of said previous image frame by $$I_t(U_2) = I_{t-1}(U_1) = I_{t-1}\left(\frac{1}{a}[U_2 - \vec{b}]\right)$$

and calculating each pixel value of said current image frame by $$I_t(x_2, y_2) = I_{t-1}(x_1, y_1) +$$
$$\alpha[I_{t-1}(x_1 + 1, y_1) - I_{t-1}(x_1, y_1)] +$$
$$\beta[I_{t-1}(x_1, y_1 + 1) - I_{t-1}(x_1, y_1)] +$$
$$\alpha\beta[I_{t-1}(x_1, y_1) - I_{t-1}(x_1, y_1 + 1) +$$
$$I_{t-1}(x_1 + 1, y_1 + 1) - I_{t-1}(x_1 + 1, y_1)],$$

where $\alpha$ and $\beta$ are fractional numbers of each pixel location $(x_2,y_2)$ of said current frame in said previous frame.

8. The apparatus of claim 2, wherein said local motion-compensator performs said active local motion compensation based on a local motion of said output video data stream.

9. The apparatus of claim 8, wherein said local motion is estimated based on said motion and macro-block information of said input video data stream by using a block-matching technique.

10. The apparatus of claim 8, wherein said local motion is estimated based on motion and macro-block information of said previous image frame.

11. A method of transcoding image data in a digital TV system, the method comprising the steps of:

(a) determining whether a global motion exists in a current image frame received using motion and macro-block information of said current image frame;

(b) estimating global motion parameters if said global motion exists in said current image frame, said global motion parameters representing a camera zoom level and a horizontal camera rotation level;

(c) performing a global motion compensation on said current image frame if said global motion exists in said current image frame by calculating each pixel value of said current image frame using its corresponding pixel values of a previous image frame, said previous image frame being determined by using said global motion parameters; and (d) further performing local motion compensation on said current image frame, wherein the step (b) includes:

(b1) determining an error value of said current image frame when said global motion exists in said current image frame using said global motion parameters and said current image frame before and after a camera motion, respectively;

(b2) setting previous global motion parameter values as said global motion parameters if said error value is less than a limiting value, said previous global motion parameter values being estimated earlier for compensating said previous image frame; and (b3) newly estimating said global motion parameters when said error value is greater than or equal to said limiting value.

12. The method of claim 11, wherein, in the step (a), whether said global motion exists in said current image frame is determined by comparing a first number of intra macro blocks and a second number of non-intra macro blocks of said motion and macro-block information of said current image frame.

13. The method of claim 11, wherein the step (b) includes:

(b1) determining said error value of said current image frame by using the following equation if said global motion exists in said current image frame $$E(a, \vec{b}) = \sum_i |\hat{U}_2 - U_2|^2,$$

where $\alpha$ and $\vec{b}$ represent said global motion parameters, and $\hat{U}_2$ and $U_2$ represent image coordinates of said current image frame before and after a camera motion, respectively;

(b2) setting said previous global motion parameter values as said first and second global motion parameters if said error value is less than said limiting value, said previous first and second parameter values being estimated earlier for compensating said previous image frame; and (b3) newly estimating said global motion parameters if said error value is greater than or equal to said limiting value.

14. The method of claim 13, wherein in the step (b3), said global motion parameters are newly estimated by $$a = \frac{\sum \langle U_2, U_1 \rangle - \frac{1}{N} \langle \sum U_2, \sum U_1 \rangle}{\sum \langle U_1, U_1 \rangle - \frac{1}{N} \langle \sum U_1, \sum U_1 \rangle} \text{ and}$$

-continued $$\vec{b} = \frac{1}{N}\left(\sum U_2 - a \cdot \sum U_1\right),$$

where
- (,) represents an inner product operation,
- $U_1$ represents image coordinates of said previous image frame, and
- $U_2$ represents image coordinates of said current image frame.

15. The method of claim 11, wherein said global motion compensation is performed by using a bi-linear interpolation method.

16. The method of claim 11, wherein the step (c) includes:
   (c1) determining a frame location of said previous image frame for compensating said current image frame by using $$I_t(U_2) = I_{t-1}(U_1) = I_{t-1}\left(\frac{1}{a}[U_2 - \vec{b}]\right);$$

and
   (c2) determining each pixel value of said current image frame by $$I_t(x_2, y_2) = I_{t-1}(x_1, y_1) +$$
$$\alpha[I_{t-1}(x_1 + 1, y_1) - I_{t-1}(x_1, y_1)] +$$
$$\beta[I_{t-1}(x_1, y_1 + 1) - I_{t-1}(x_1, y_1)] +$$
$$\alpha\beta[I_{t-1}(x_1, y_1) - I_{t-1}(x_1, y_1 + 1) +$$
$$I_{t-1}(x_1 + 1, y_1 + 1) - I_{t-1}(x_1 + 1, y_1)],$$

where $\alpha$ and $\beta$ are fractional numbers of each pixel location $(x_2, y_2)$ of said current frame in said previous frame.

17. The method of claim 11, wherein the step (d) includes the steps of:
   (d1) estimating a local motion of said current image frame; and
   (d2) performing said local motion compensation on current image frame using said local motion estimated.

18. The method of claim 17, wherein said local motion is estimated based on said motion and macro-block information of said current image frame by using a block-matching technique or said local motion is estimated based on motion information of said previous image frame.

* * * * *